(12) United States Patent
Dewart et al.

(10) Patent No.: US 8,091,968 B2
(45) Date of Patent: Jan. 10, 2012

(54) SOLENOID VALVE CONTROLLER

(75) Inventors: Wolfgang Dewart, Leichlingen (DE); Jan Van Cauwenberge, Aalter (BE); Bart Colpaert, Torhout (BE); Peter Desloovere, Waregem (BE); Michael Siotto, Deinze/Astene (BE)

(73) Assignee: Tyco Electronics Belgium EC BVBA, Oostkamp (BE)

( * ) Notice: Subject to any disclaimer, the term of this patent is extended or adjusted under 35 U.S.C. 154(b) by 986 days.

(21) Appl. No.: 12/063,077

(22) PCT Filed: Aug. 30, 2006

(86) PCT No.: PCT/EP2006/008490
§ 371 (c)(1),
(2), (4) Date: Feb. 6, 2008

(87) PCT Pub. No.: WO2007/025741
PCT Pub. Date: Mar. 8, 2007

(65) Prior Publication Data
US 2010/0219680 A1    Sep. 2, 2010

(30) Foreign Application Priority Data
Aug. 31, 2005  (DE) .................. 10 2005 041 240

(51) Int. Cl.
*B60T 8/36* (2006.01)

(52) U.S. Cl. .................................... 303/119.3
(58) Field of Classification Search ............ 303/119.2, 303/119.3; 251/129.15; 137/596.17, 884; 336/208
See application file for complete search history.

(56) References Cited

U.S. PATENT DOCUMENTS

| 5,513,905 A | 5/1996 | Zeides et al. |
| 5,520,447 A | 5/1996 | Burgdorf et al. |
| 7,237,850 B2 * | 7/2007 | Sanada ............ 303/119.2 |

FOREIGN PATENT DOCUMENTS

| DE | 295 08 389 U1 | 8/1995 |
| DE | 195 18 519 A1 | 11/1996 |
| DE | 198 33 498 A1 | 1/1999 |
| WO | WO 96/13415 | 5/1996 |
| WO | WO 2005/058664 A2 | 6/2005 |

* cited by examiner

*Primary Examiner* — Christopher Schwartz
(74) *Attorney, Agent, or Firm* — Barley Snyder LLP

(57) ABSTRACT

A solenoid valve controller includes a control housing having a base provided with projections. Each of the projections has a recess provided therein. At least one elastomer element is arranged between at least two of the projections. A magnet coil yoke abuts the elastomer element and is fixed to at least one of the recesses. The elastomer element drives the magnet coil yoke away from the base and into engagement with an outer side of the hydraulic device when the magnet coil yoke is pressed toward the base by the outer side of the hydraulic device. The magnet coil yoke receives a solenoid valve unit of the hydraulic device therein.

20 Claims, 5 Drawing Sheets

SOLENOID VALVE CONTROLLER

FIELD OF THE INVENTION

The invention relates to a controller for solenoid valves, preferably a solenoid valve control unit for a hydraulic brake of a motor vehicle, and in particular the solenoid valve control unit of an antilock braking system (ABS) and/or an electronic stability program (ESP) of a motor vehicle. The invention also relates to an ABS/ESP hydraulic controller, wherein the solenoid valve controller according to the invention is rigidly connected to a hydraulic device.

BACKGROUND

An ABS for a motor vehicle avoids excessive slipping between the tires and the road during braking, whereby the steering capacity and the lateral traction of the motor vehicle are maintained. An ABS four-channel system comprises two return pumps and two solenoid valves per wheel brake cylinder. Of the eight solenoid valves of the ABS for a car, four are usually open and the other four closed. When using the ABS during excessive slipping between the tires and the road, a line to the wheel brake cylinder of the wheel to be decelerated or the locking wheel is first blocked by a solenoid valve (that was previously open). If this is not sufficient to reduce the slipping or to release the locking wheel, the pressure is reduced by opening the other solenoid valve. At the same time, a return pump pumps brake fluid back into a line between the main brake cylinder and the solenoid valve. The excessive slipping is thereby reduced or the locking wheel can turn again, so a driver regains control of his vehicle.

An ESP in a motor vehicle takes care of the stability of the vehicle by targeted deceleration of individual wheels, for example during cornering. The ESP obtains the information required for this via sensors at the rims, an accelerator pedal sensor, an angle sensor on the steering wheel, and longitudinal, transverse and rotary acceleration sensors. The ESP in particular prevents instability of the vehicle during cornering, which can occur for example in the event of unadjusted speed, an unpredictable change in the surface of the road (wetness, slickness, dirt accumulation) or in the event of a suddenly necessary swerve. An ESP computer unit detects the ESP case with the aid of the data supplied by the sensors and controls a targeted braking operation.

The braking operations required for the ABS and the ESP are performed by a hydraulic controller which adjusts the requisite brake pressures at the caliper by means of solenoid valves. The hydraulic controller comprises a hydraulic device, also called a Hydraulic Control Unit (HCU), and a control device, also called an Electronic Control Unit (ECU). Valve units which open or close to control the brake fluid are located in the hydraulic device. The valve units are actuated by magnet coils which are located in the hydraulic controller.

In hydraulic controllers in the prior art, each magnet coil or each magnet coil yoke of the hydraulic controller is cast with a thermoplastic elastomer to achieve a requisite resilient pressing force of the magnet coil yoke in a direction of the hydraulic device. These cast thermoplastic elastomers also seal the magnet coil yoke from the hydraulic device. The process of casting each individual magnet coil yoke is time-consuming, complex and entails high costs.

Resilient elements made of a plastic material are also used in the prior art, which as separate, loose component parts, are used to provide a resilient force to the magnet coil yoke. Plastic resilient elements of this type can break and reduce the maximum operating temperature of the hydraulic controller as the plastic resilient elements soften at excessive temperatures and therefore diminish in resilient force. Assembly of the plastic resilient elements together with the magnet coil yoke is also time-consuming, and this in turn entails high production costs.

DE 198 33 498 A1 discloses a controller for a hydraulic brake which comprises an electronic control unit, flanged to a hydraulic unit, with coil units for solenoid valves. The coil units are fixed in the electronic control unit in this case between a base of the electronic control unit and a coil retention device located at free ends of the coils. Resilient mounting of the coil units takes place, on the one hand, via a resilient washer between the base of the electronic control unit and each coil unit and, on the other hand, via projections formed on the coil retention device and that are arranged mutually offset and so as to oppose one another, the projections providing, in collaboration with an outer side of the hydraulic unit, a second resilient force for the coil units.

Assembly of the coil units with the resilient washers and that of the coil retention device is complex. As a respective resilient force is provided at the two opposing free ends of the coil units, exact positioning of the coil unit in the assembled state of the electronic control unit on the hydraulic unit is not always ensured either.

SUMMARY

It is an object of the invention to provide an improved controller for solenoid valves of a hydraulic device, which in particular allows simple assembly of the magnet coil yoke, on the one hand, is composed of a few component parts and, on other hand, ensures exact positioning of the magnet coil yoke on the hydraulic device at any time in the assembled state.

The object of the invention is achieved by means of a controller for solenoid valve units of a hydraulic device, wherein a respective magnet coil yoke of the controller is pressed against an outer side of the hydraulic device by an elastomer element that provides a resilient force. According to the invention, the respective magnet coil yoke in this case preferably sits on the elastomer element, which is arranged on a base or an intermediate base of the controller.

According to the invention, play-free mounting of the magnet coil yoke in a hydraulic controller is simply achieved. By means of the arrangement of the intermediate base, the elastomer element, the magnet coil yoke and the outer side of the hydraulic device in series, pressing of the magnet coil yoke after combining the controller with the hydraulic device is possible, on the one hand, and exact positioning of the magnet coil yoke in the controller, and thus also above the solenoid valve element of the hydraulic device, is achieved, on the other hand. This applies in particular to exact axial positioning of the magnet coil yoke. According to the invention, the elastomer elements and the outer side of the hydraulic device each serve as bearings for the magnet coil yoke.

Overall the thermal stability of the solenoid valve controller is increased by the use of elastomer elements which have a higher thermal stability than the plastic material of the resilient elements used previously. In the prior art, a solenoid valve controller could have a maximum temperature of 120° C. without excessive losses in resilient force being indicated on the resilient elements. According to the invention, this weak point is eliminated, so the use of the elastomer elements increases the thermal stability of the solenoid valve controller and thus also that of the hydraulic controller to up to 180° C.

Owing to the simple construction of the solenoid valve controller, it is possible to use a simply constructed tool during assembly thereof. Separate, loose resilient elements are also no longer required, as the elastomer elements can be provided so as to be directly and rigidly connected to the intermediate base of the solenoid valve controller.

The invention makes it possible to provide a defined pressing force of the magnet coil yoke onto the hydraulic device virtually exclusively via the elastomer element, in other words the material thereof and its shaping. The arrangement of the elastomer elements also allows simple adaptation of the material or geometry to changing conditions in the production process as according to the invention it is easy to adjust the pressing force of the magnet coil yoke onto the hydraulic device. Thus, for example, when casting the elastomer elements onto the intermediate base, only slightly more or less elastomer per magnet coil yoke needs to be applied and thus a slightly more rigid or slightly weaker mounting can be achieved.

According to the invention, complete casting of the magnet coil yoke is no longer necessary, so a lot of casting material and time can be saved. Furthermore, compared with the prior art, a more simply constructed solenoid valve controller is provided.

In a preferred embodiment of the invention, the elastomer elements have the form of a segment or section of a sphere or that of a truncated cone. The form of a completely filled hemisphere or a droplet form of the elastomer material, which is freely established after casting and depends on a surface tension of the casting material in the liquid state or the thixotropy thereof, is particularly preferred. So the elastomer elements have a specific resilience when pressed together, they may be provided with recesses, a hole-like recess preferably being centrally provided through the elastomer element.

During production of the solenoid valve controller, the elastomer element may be provided directly on the intermediate base of the control housing or on a base member which is then secured in the intermediate base. This can take place for example by gluing or a different type of mechanical fastening. Direct casting of the elastomer element onto the base or base member is preferred.

In a preferred embodiment of the invention, the elastomer element and a seal, via which the solenoid valve controller can be fixed in a fluid-tight manner on the hydraulic device, consist of the same material, whereby it is possible to provide the elastomer elements and the seal on the control housing in one operation, a two-component casting process preferably being used for this purpose. It is also possible to construct the elastomer elements/base member and the seal in a connected manner as a web, which can be inserted into the control housing. It is also possible to provide the seal of the solenoid valve controller on the base members of the elastomer elements, wherein for example the elastomer elements and the seal may be provided on the base members using a casting process. However, it is also possible to produce the elastomer elements and the seal of the solenoid controller from two different materials.

A preferred material for the elastomer element, as well as for the seal, is a silicone compound, so the entire solenoid valve controller is more heat resistant.

According to the invention, a simply constructed solenoid valve controller is provided, during the production of which the previous complex and separate casting process of the magnet coil yoke is replaced by the provision of elastomer elements on the intermediate base and the preferably completely peripheral seal on a housing edge of the solenoid valve controller. The elastomer element is also not so detrimental to the position of the magnet coil yoke, as in the prior art, in which the resilient elements used tend to distort or warp.

BRIEF DESCRIPTION OF THE DRAWINGS

The invention will be described in more detail herein with reference to the drawings, in which.

DETAILED DESCRIPTION OF THE EMBODIMENT(S)

The following description relates to a solenoid valve controller of an ABS or an ESP of a motor vehicle, wherein the intention is not to restrict the invention hereto, rather it should include general controllers for solenoid valves. The description also relates to the portion of an ABS/ESP controller in which magnet coil yokes are housed. However, the intention is not to restrict the invention to this portion of the controller, rather, on the one hand, it should include a solenoid valve controller which comprises the magnet coil yoke in one portion and the corresponding electrical elements in another, and, on the other hand, is intended to relate to a hydraulic controller which comprises the solenoid valve controller according to the invention assembled on a hydraulic device.

Figure 1:
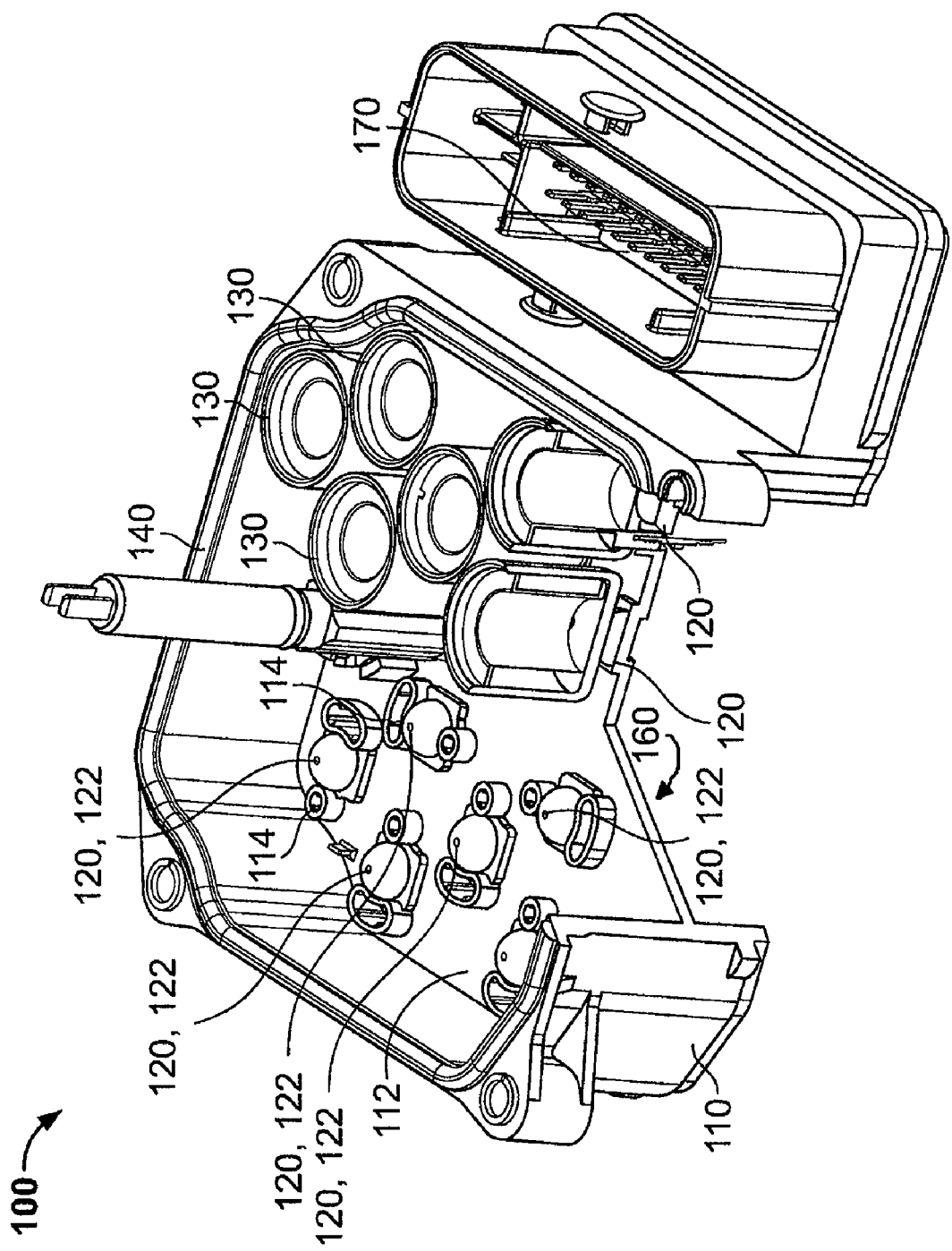
FIG. 1 shows a first embodiment of a solenoid valve controller according to the invention in a partially sectional perspective view.

FIG. 1 shows a first embodiment of a solenoid valve controller 100 according to the invention, which can be divided into substantially two portions. One portion comprises magnet coil yokes 130 which, together with magnet coils, actuate solenoid valve units 230 of a hydraulic device 200 (see FIGS. 4 and 5). The other portion of the solenoid valve controller 100 comprises electrical elements 160, which are used to electrically control the magnet coils. These two portions are formed inside a control housing 110 of the solenoid valve controller 100 and are spatially separated from each other by an intermediate base or base 112. The magnet coils are supplied with electrical current or control signals from the electrical elements 160 via contacts or wires which are passed through passage recesses in the base 112.

In the illustrated embodiment, a plurality of the magnet coil yokes 130 are arranged in the control housing 110. The magnet coil yokes 130 are provided on elastomer elements 120, which resiliently fasten the magnet coil yokes 130 in the control housing 110. Each of the elastomer elements 120 is preferably located between two projections having recesses 114 in the base 112 in which the magnet coil yokes 130 are fixed in a radial direction with respect to their longitudinal axis. One of the recesses 114 is preferably reniform in this case whereas the other recess 114 is circular or cylindrical. The two recesses 114 are also preferably arranged so as to be diametrically opposed to each other with respect to the elastomer element 120. The magnet coil yoke 130 can be radially fixed in one or both of the recesses 114 by a pinching rib of the magnet coil yoke 130, for example. The two respective recesses 114, in addition to the radial fixing, provide adequate axial retention for the magnet coil yoke 130, so, on the one hand, the magnet coil yoke 130 remains on the recesses 114 and, on the other hand, the magnet coil yoke 130 cannot detach from the recesses 114 and become lost (for example in the event of a rotation (with respect to FIG. 1) of the solenoid valve controller 100).

Radial fixing does not necessarily have to take place via the recesses 114 and the pinching rib. Other devices, such as mutually corresponding projections and recesses (for example a cylinder portion which is displaceably guided in the longitudinal direction in a cylinder recess) on the magnet coil yoke 130 and on/in the base 112 are possible, which hold both parts in position so they are radially fixed with respect to each other. Security against the magnet coil yoke 130 falling out on rotation of the solenoid valve controller 100 can be provided, for example, by a conveying safeguard or corresponding latching hooks (for example on the cylinder portion) which only allow displacement of the magnet coil yoke 130 in a downward direction (with respect to FIG. 1).

In the illustrated embodiment of FIG. 1, the elastomer element 120 is a segment of a sphere which is formed by a pole of a sphere with a parallel of latitude. It is also possible to form the elastomer element 120 from a segment of a sphere which is delimited by two parallels of latitude (or longitudinal parallels). The elastomer element 120 is preferably approximately a hemisphere 122 which is provided directly on the base 112 of the control housing 110. The elastomer element 120 can, however, also be provided on a support or base member 128 (see FIG. 2A) which is secured in the base 112 of the control housing 110, as described below.

In a preferred embodiment of the invention, twelve elastomer elements 120 are provided on the base 112 of the control housing 110 with a single magnet coil yoke 130 provided on each of the elastomer elements 120.

Figure 2:
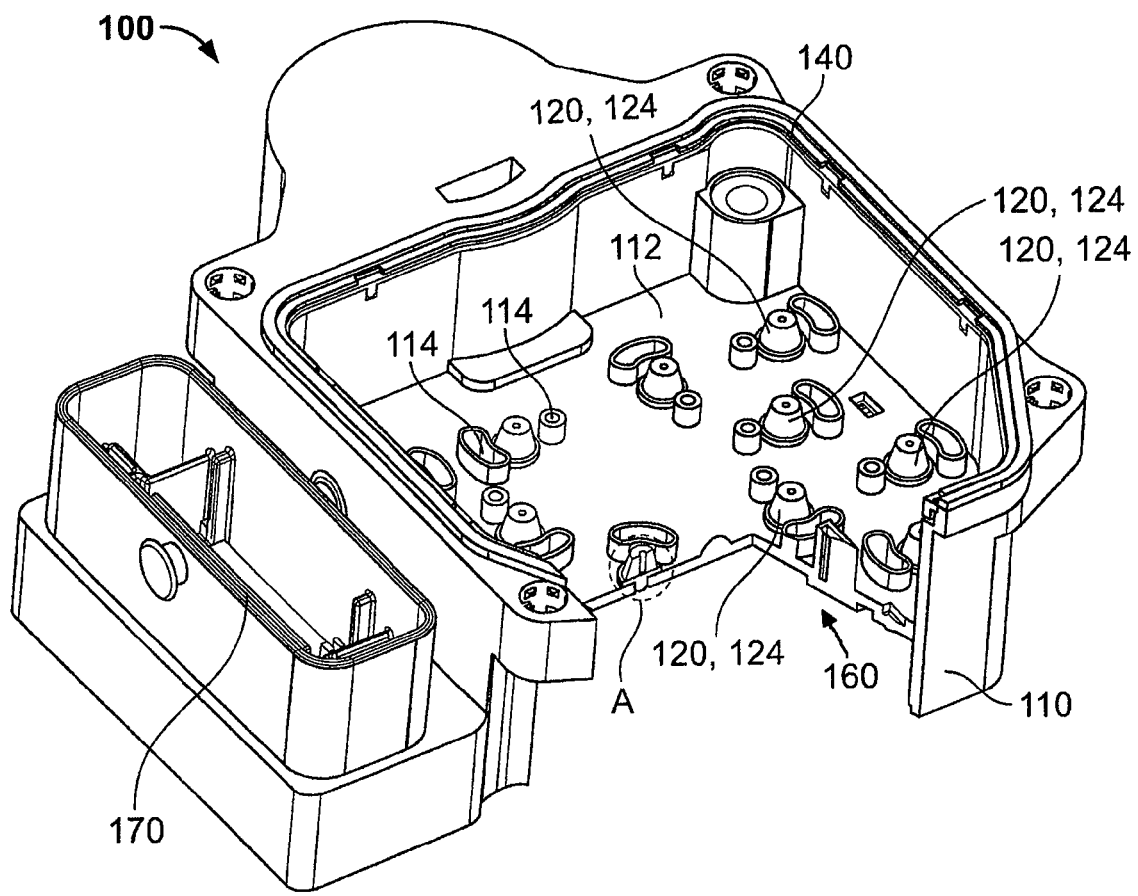
FIG. 2 shows a second embodiment of the solenoid valve controller according to the invention in a partially sectional perspective view.
Figure 2A:
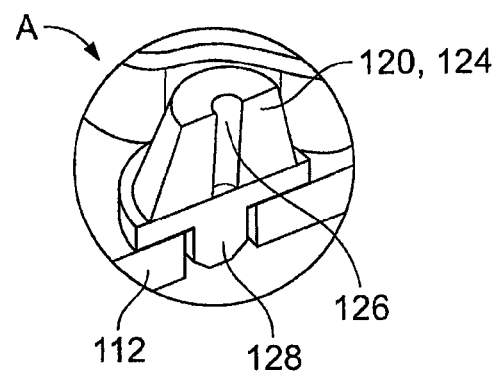
FIG. 2A shows a detailed view of an elastomer element shown in detail A of FIG. 2 in a partial sectional perspective view according to the invention.

FIG. 2 shows a second embodiment of the elastomer elements 120 according to the invention which, on the one hand, have the form of a truncated cone 124 and, on the other hand, are rigidly connected to the control housing 110 by the support or base member 128. This can be seen more clearly in a detail A in FIG. 2A in which the base member 128 is rigidly connected to the base 112 of the control housing 110, for example, by gluing, riveting, latching, screwing or clipping. In the illustrated example, an extension of the base member 128 projects into an opening in the base 112, wherein the extension can engage, with projections formed thereon, in corresponding recesses in the opening or, for example, can latch by means of latching hooks on an opposing side of the base 112. The truncated cone 124 is fixed to the base member 128.

In a preferred embodiment of the invention, the elastomer element 120 (for example, the truncated cone 124 or the hemisphere 122) is cast directly onto the base 112 of the control housing 110 or the base member 128 by a casting process. Other ways of fastening the elastomer elements 120 to the base 112 or the base member 128 are possible, however, such as gluing or screwing/interlocking by a suitable device on the elastomer element 120. It is also possible to produce the base member 128 together with the elastomer element 120 in a two-component casting process.

In a preferred embodiment of the invention, recesses 126 may be provided in the elastomer element 120. This can be seen for example in the detail A in FIG. 2A in the truncated cone 124. In this embodiment, the truncated cone 124 is arranged with its wider diameter on the base member 128 and with the recess 126 extending centrally through the truncated cone 124 to its smaller diameter. The recess 126 is substantially cylindrical and the dimensions of which affect the resilient force, which is provided by the truncated cone 124.

Other resilient forces may be produced depending on the size of the recess 126 in the elastomer element 120. The recess 126 does not have to have a circular cylindrical form but can have any desired form as long as reliable pressing of the magnet coil yoke 130 onto the hydraulic device 200 is ensured. The recess 126 does not have to be centrally located in the elastomer element 120 or be arranged so as to pass through the elastomer element 120, but may be provided as desired inside the elastomer element 120.

Figure 3:
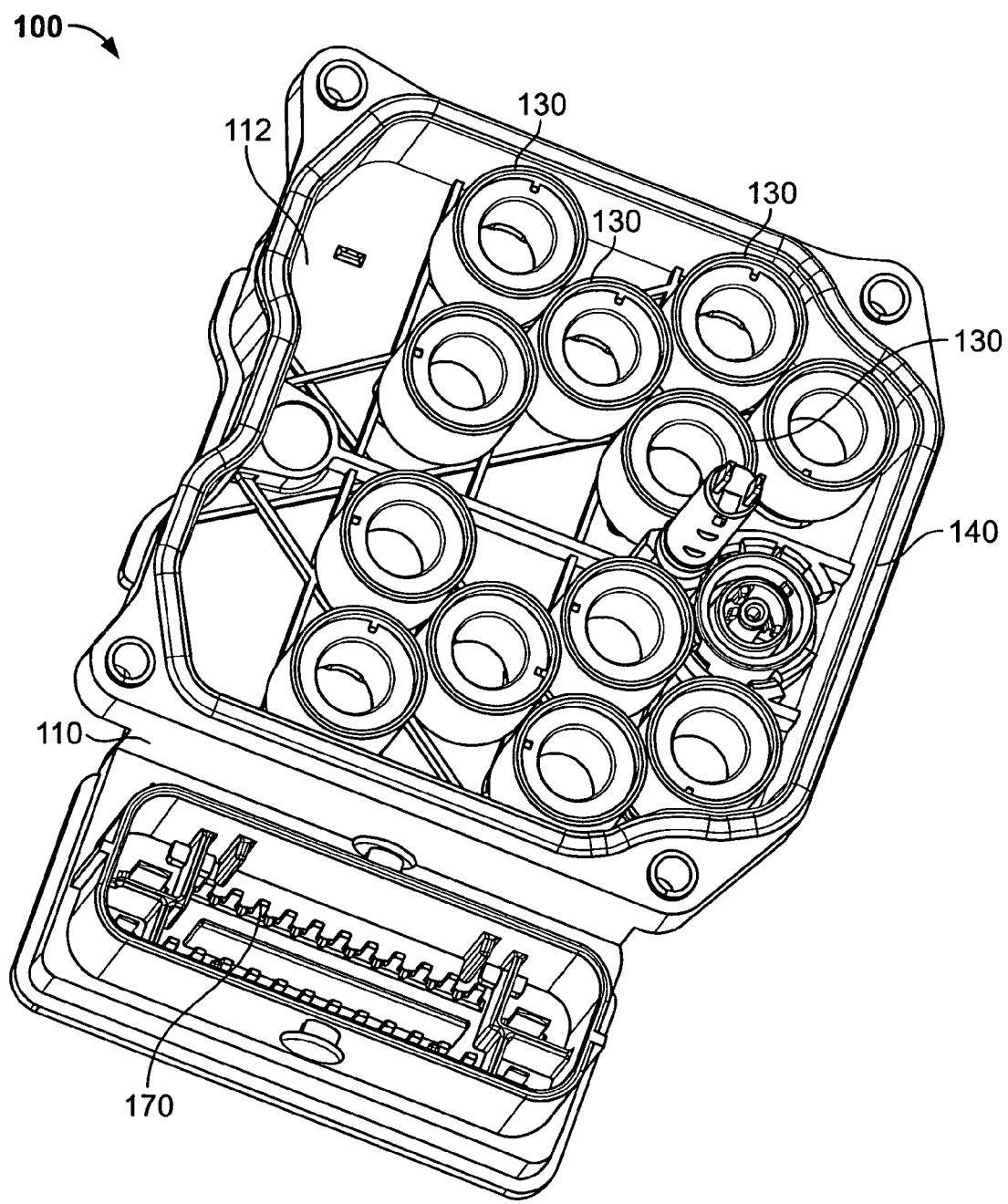
FIG. 3 shows a completely assembled solenoid valve controller according to the invention in a perspective view.

FIG. 3 shows the solenoid valve controller 100 in its completely assembled state provided with twelve of the magnet coil yokes 130. In this state, the solenoid valve controller 100 can be screwed or rigidly connected to the hydraulic device 200 (see FIGS. 4 and 5) for the hydraulic controller 300 for the ABS/ESP. An electrical connector 170 of the solenoid valve controller 100 or the hydraulic controller 300 can also clearly be seen in FIG. 3, which connection provides the electrical elements 160 with electrical current and control commands.

Figure 4:
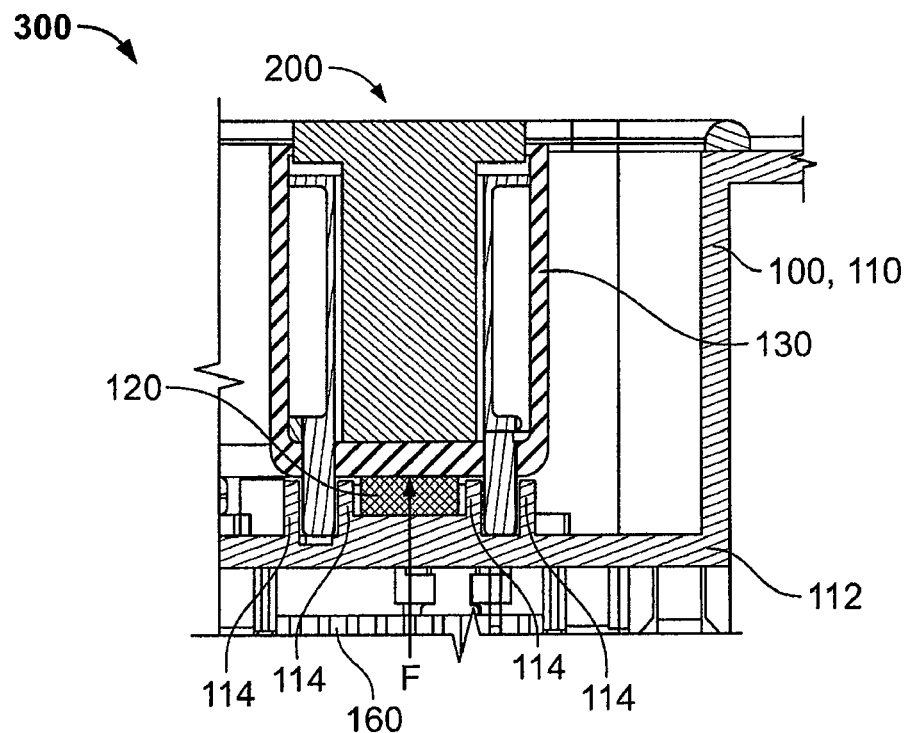
FIG. 4 shows a first sectional side view of an arrangement according to the invention of the elastomer element and a magnet coil yoke.
Figure 5:
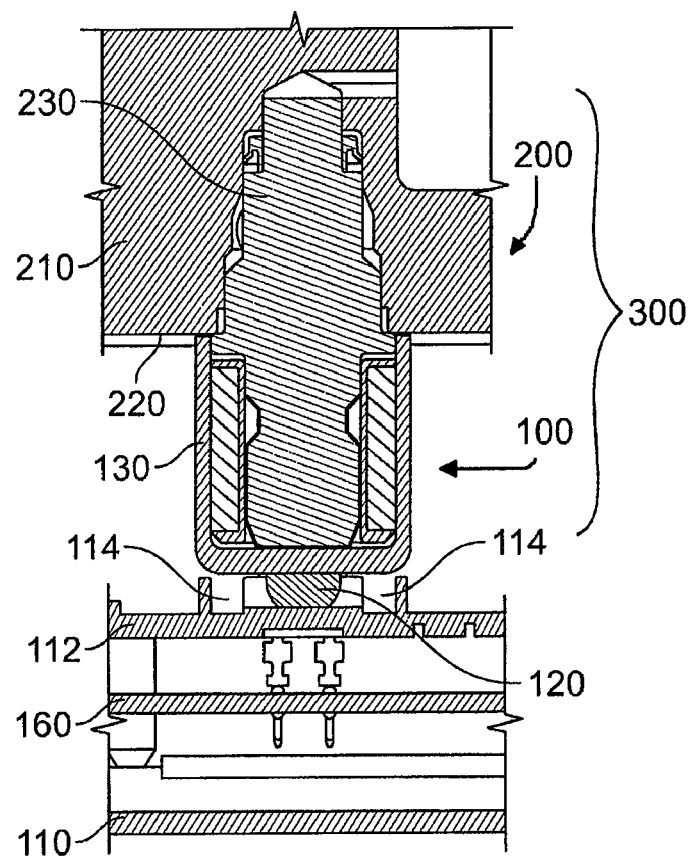
FIG. 5 shows a second sectional side view of the arrangement according to the invention of the elastomer element and the magnet coil yoke.

FIGS. 4 and 5 show details of the hydraulic controller 300 according to the invention in the assembled state with the solenoid valve controller 100 being securely screwed in a fluid-tight manner to the hydraulic device 200, and the elastomer element 120 of the magnet coil yoke 130 is positioned on the solenoid valve unit 230 in a predetermined defined position. The magnet coil yoke 130 at least partially surrounds the solenoid valve unit 230 in this case.

Before the hydraulic controller 300 is assembled, the magnet coil yokes 130 protrude from the base 112 of the solenoid valve controller 100 slightly more upwardly (with respect to FIGS. 1, 3, 4 and 5) than in the assembled state, so when connecting the solenoid valve controller 100 to the hydraulic device 200, the magnet coil yokes 130 are pressed by an outer side 220 of a housing 210 of the hydraulic device 200 onto the elastomer elements 120. As a result, the elastomer elements 120 impart to the magnet coil yokes 130 a defined pressing pressure to the outer side 220 of the hydraulic device 200 and this ensures that the magnet coil yokes 130 are provided inside the hydraulic controller 300 so as to always adjoin, with their longitudinal ends, the outer side 220 of the hydraulic device 200 firmly and in a planar manner.

As a result, play-free positioning of the magnet coil yoke 130 on or above the solenoid valve units 230 is ensured with tolerance compensation between the ECU-side magnet coil yoke 130 and the HCU-side solenoid valve units 230 being achieved. The amount of the pressure and the requisite tolerance compensation may be freely adjusted over a wide range via the material of the elastomer elements 120 and the geometry of the elastomer elements 120.

Arrow F in FIG. 4 illustrates the direction of the force from the elastomer element 120 onto the magnet coil yoke 130. FIG. 4 also shows the two recesses 114, which serve as a centering and/or fixing device, in the base 112.

The control housing 110 is preferably sealed from the outer side 220 of the hydraulic device 200 by a seal 140 provided along a housing edge of the control housing 110, as shown in FIGS. 1 to 3. A single seal 140, which completely surrounds the housing edge, is preferably used in this case.

Figure 6:
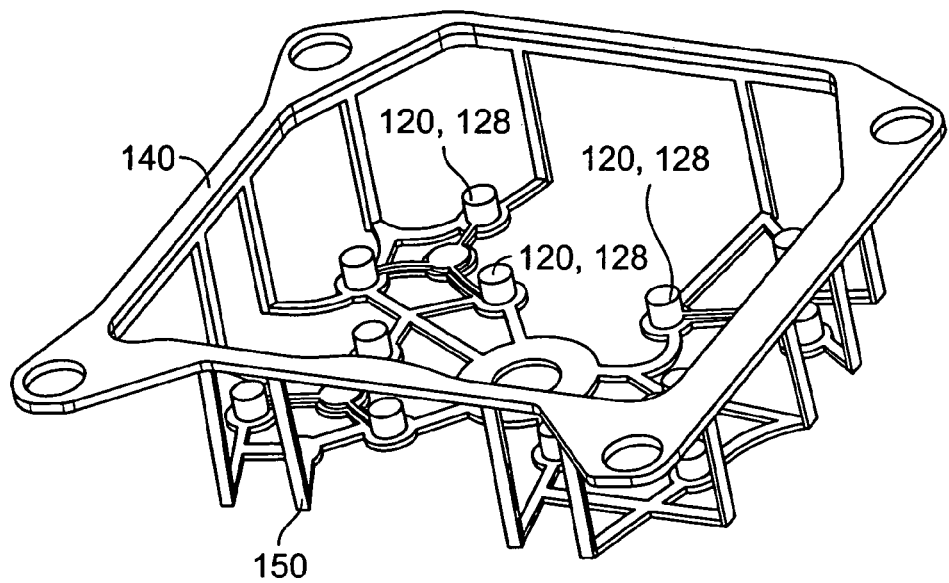
FIG. 6 shows a web having plurality of the elastomer elements according to the invention or support members in connection with a seal of the solenoid valve controller in a perspective view.

FIG. 6 shows an arrangement according to the invention of the seal 140 of the solenoid valve controller 100 on which the elastomer elements 120 are provided. The seal 140 may also be formed jointly with base members 128 via a web 150 instead of with the elastomer elements 120.

The web 150 comprises the seal 140 and the elastomer elements 120 and can, for example, be produced by a casting process and subsequently be provided on the solenoid valve controller 100. The web 150 may also be provided directly on the solenoid valve controller 100 by an injection molding process. According to the invention, it is also possible to produce the web 150 in a two-component process with the elastomer elements 120 (or the base members 128) and the seal 140 consisting of two different materials. This simple construction of the web 150 means the seal 140 and the elastomer elements 120 (or the base members 128) may be produced simultaneously in one operation.

Figure 7:
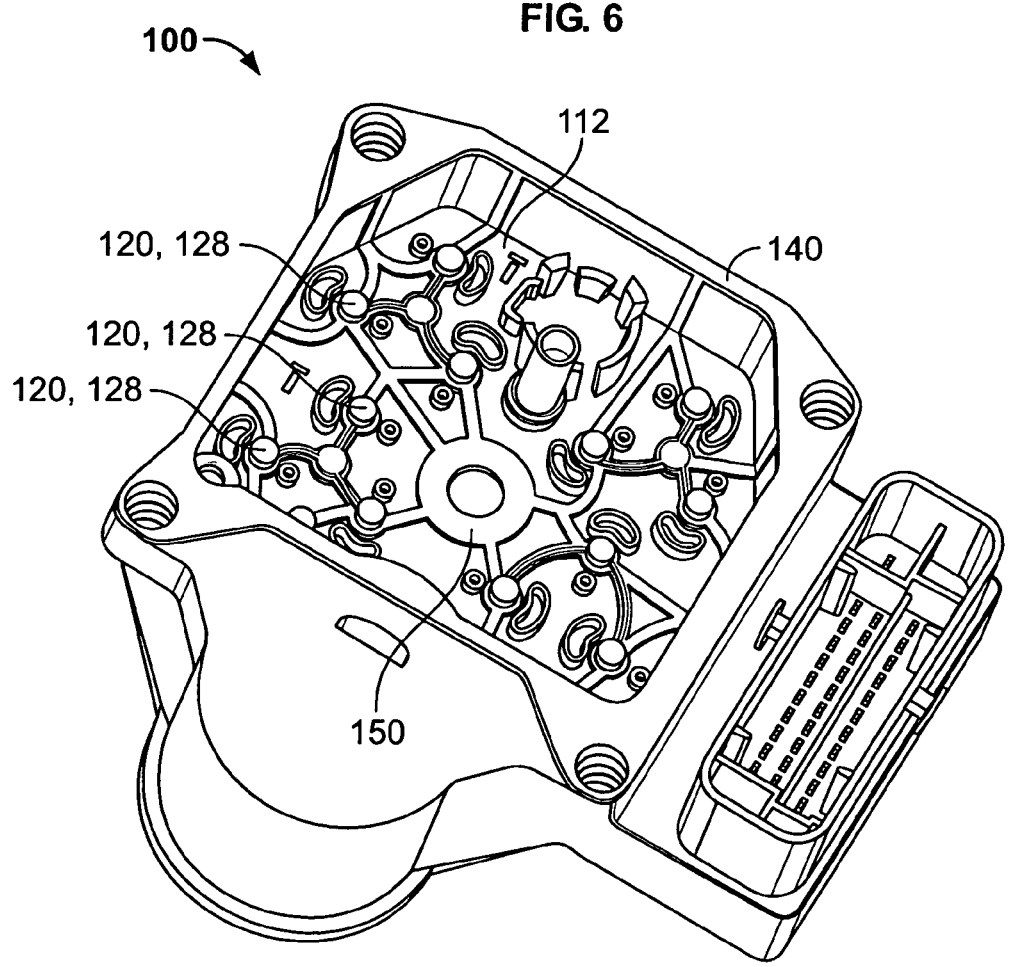
FIG. 7 shows the arrangement of FIG. 6 assembled in the solenoid valve controller in a perspective view.

FIG. 7 shows the solenoid valve controller 100 with the web 150 comprising the seal 140 and the elastomer elements 120 provided therein. The seal 140 thereby produces a fluid-tight connection between the solenoid valve controller 100 and the hydraulic device 200.

What is claimed is:

1. A solenoid valve controller, comprising:
   a control housing having a base provided with projections, each of the projections having a recess provided therein;
   at least one elastomer element arranged between at least two of the projections; and
   a magnet coil yoke abutting the elastomer element and fixed to at least one of the recesses, the elastomer element driving the magnet coil yoke away from the base when the magnet coil yoke is pressed toward the base.

2. The solenoid valve controller of claim 1, wherein the elastomer element is a truncated cone.

3. The solenoid valve controller of claim 1, wherein the elastomer element is a hemisphere.

4. The solenoid valve controller of claim 1, wherein the at least two recesses are diametrically opposed to each other with respect to the elastomer element.

5. The solenoid valve controller of claim 1, wherein the magnet coil yoke is fixed in a radial direction with respect to a longitudinal axis thereof.

6. The solenoid valve controller of claim 1, wherein the elastomer element includes a base member extending into an opening in the base that fixes the elastomer element thereto.

7. The solenoid valve controller of claim 1, wherein the elastomer element is provided with a recess that extends centrally therethrough.

8. The solenoid valve controller of claim 1, wherein a seal is provided along a housing edge of the control housing, the seal being connected to the elastomer element by a web.

9. The solenoid valve controller of claim 1, wherein each of the at least two recesses have a different shape.

10. The solenoid valve controller of claim 9, wherein the different shapes include a cylindrical shape and a reniform shape.

11. A hydraulic controller including a solenoid valve controller and a hydraulic device, the solenoid valve controller comprising:
    a control housing having a base provided with projections, each of the projections having a recess provided therein;
    at least one elastomer element arranged between at least two of the projections; and
    a magnet coil yoke that receives a solenoid valve unit of the hydraulic device, the magnet coil yoke abutting the elastomer element and fixed to at least one of the recesses, the elastomer element driving the magnet coil yoke away from the base and into engagement with an outer side of the hydraulic device when the magnet coil yoke is pressed toward the base by the outer side of the hydraulic device.

12. The hydraulic controller of claim 11, wherein the elastomer element is a truncated cone.

13. The hydraulic controller of claim 11, wherein the elastomer element is a hemisphere.

14. The hydraulic controller of claim 11, wherein the at least two recesses are diametrically opposed to each other with respect to the elastomer element.

15. The hydraulic controller of claim 11, wherein the magnet coil yoke is fixed in a radial direction with respect to a longitudinal axis thereof.

16. The hydraulic controller of claim 11, wherein the elastomer element includes a base member extending into an opening in the base that fixes the elastomer element thereto.

17. The hydraulic controller of claim 11, wherein the elastomer element is provided with a recess that extends centrally therethrough.

18. The hydraulic controller of claim 11, wherein a seal is provided along a housing edge of the control housing, the seal being connected to the elastomer element by a web.

19. The hydraulic controller of claim 11, wherein each of the at least two recesses have a different shape.

20. The hydraulic controller of claim 19, wherein the different shapes include a cylindrical shape and a reniform shape.

* * * * *